United States Patent
Amond, III et al.

(10) Patent No.: US 7,546,736 B2
(45) Date of Patent: Jun. 16, 2009

(54) METHODS AND APPARATUS FOR LOW EMISSION GAS TURBINE ENERGY GENERATION

(75) Inventors: Thomas Charles Amond, III, Mauldin, SC (US); Bradley Donald Crawley, Simpsonville, SC (US); Natesh Chandrashekar, Greenville, SC (US); Balan Nagarajan, Greenville, SC (US); Rebecca Arlene Feigl-Varela, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 28 days.

(21) Appl. No.: 11/838,016

(22) Filed: Aug. 13, 2007

(65) Prior Publication Data

US 2008/0155987 A1   Jul. 3, 2008

Related U.S. Application Data

(62) Division of application No. 10/861,257, filed on Jun. 4, 2004, now Pat. No. 7,284,378.

(51) Int. Cl.
    *F02C 1/00* (2006.01)
    *F02G 3/00* (2006.01)
(52) U.S. Cl. .............. 60/747; 60/804; 60/752
(58) Field of Classification Search .......... 60/737, 60/739, 746, 747, 804, 752
    See application file for complete search history.

(56) References Cited

U.S. PATENT DOCUMENTS

| 3,943,705 | A | * | 3/1976 | DeCorso et al. ............ 60/723 |
| 4,344,280 | A | * | 8/1982 | Minakawa et al. ....... 60/39.092 |
| 4,356,698 | A | * | 11/1982 | Chamberlain ............ 60/733 |
| 4,984,429 | A | | 1/1991 | Waslo et al. |
| 5,319,923 | A | | 6/1994 | Leonard et al. |
| 5,323,604 | A | * | 6/1994 | Ekstedt et al. ............ 60/804 |
| 5,359,847 | A | * | 11/1994 | Pillsbury et al. ........ 60/39.463 |
| 5,402,634 | A | * | 4/1995 | Marshall ................. 60/776 |
| 5,794,449 | A | | 8/1998 | Razdan et al. |
| 5,924,275 | A | | 7/1999 | Cohen et al. |
| 6,026,645 | A | * | 2/2000 | Stokes et al. ............. 60/737 |
| 6,397,602 | B2 | | 6/2002 | Vandervort et al. |
| 6,438,961 | B2 | | 8/2002 | Tuthill et al. |
| 6,474,070 | B1 | * | 11/2002 | Danis et al. ............. 60/739 |
| 6,598,383 | B1 | * | 7/2003 | Vandervort et al. ........ 60/773 |
| 6,772,583 | B2 | * | 8/2004 | Bland .................... 60/39.37 |
| 6,928,823 | B2 | * | 8/2005 | Inoue et al. ............. 60/776 |
| 6,931,853 | B2 | * | 8/2005 | Dawson .................. 60/725 |
| 7,185,494 | B2 | * | 3/2007 | Ziminsky et al. .......... 60/746 |
| 7,185,496 | B2 | | 3/2007 | Herlihy |

* cited by examiner

*Primary Examiner*—William H Rodríguez
(74) *Attorney, Agent, or Firm*—Armstrong Teasdale LLP

(57) ABSTRACT

A low-emission method for producing power using a gas turbine includes premixing a plurality of fuel and air mixtures, injecting the fuel and air mixtures into a combustion chamber using a plurality of fuel nozzles, and adjusting a ratio of fuel and air injected by at least one of the nozzles to control a fuel/air concentration distribution within the combustion chamber.

6 Claims, 9 Drawing Sheets

METHODS AND APPARATUS FOR LOW EMISSION GAS TURBINE ENERGY GENERATION

CROSS-REFERENCE TO RELATED APPLICATIONS

This application is a divisional of U.S. patent application Ser. No. 10/861,257, filed Jun. 4, 2004, now U.S. Pat. No. 7,284,378 which is hereby incorporated by reference and is assigned to assignee of the present invention.

BACKGROUND OF THE INVENTION

This invention relates generally to power generation involving the combustion of gas fossil fuels, and more particularly to methods and apparatus for reducing pollutant emissions in heavy-duty gas turbine power generators.

As used herein, a 50 Hz F-Class heavy-duty gas turbine refers to a gas turbine having a rated ISO day firing temperature on the order of 2400° F. (1315° C.), the highest average working fluid temperature in the gas turbine from which work is extracted, measured at the inlet plane of first rotating, work-extracting turbine blade, or bucket. Levels of NOx emissions below 9 ppm, corrected to 15% oxygen, can be achieved in such gas turbines using known premixing technology along with further enhancements to Dry Low NOx (DLN) systems currently available in the 50 and 60 Hz F-Class turbine markets. Low emission gas turbines of this type provide bluff body flame stabilization via a combination and optimization of component geometries, a center fuel nozzle in the combustor that acts as a combustion flame stability anchor for the overall flame structure of the combustion system, a fuel and air staging system design that includes multiple fuel manifolds and introduction points in the combustor, and sealing between key mating components. At least one known gas turbine, the General Electric model MS7001FA gas turbine (available from General Electric Co., Fairfield, Conn.), already achieves less than 9 ppm NOx emissions operating in the 60 Hz power generation market. However, another known gas turbine, the GE MS9001 FA 50 Hz gas turbine, is currently guaranteed at less than 25 ppm NOx emissions.

Governmental legislation now being pursued or already in effect in several international locations such as Northern Italy and Spain will significantly limit the amount of NOx emissions allowed from 50 Hz heavy-duty gas turbines used in electrical power generation.

One way to reduce such emissions is to install a selective catalytic reduction (SCR) device on the exhaust system of the gas turbine plant. SCR devices can be costly to install and operate, require expensive process chemicals such as anhydrous ammonia on a continuous basis to function, and carry the environmental risk of ammonia emission as a by-product of their operation. Many countries prohibit the use of ammonia-based SCR devices, and in such countries, gas turbine operators must operate lower firing temperatures below intended design ratings to achieve emissions compliance. While lower NOx emissions can be achieved at firing temperatures below the originally intended design ratings of a gas turbine (a process known in the art as "derating" the turbine), the power output and efficiency of the plant are reduced, ultimately resulting in lost revenue opportunity for the power producer.

In many early versions of gas turbine NOx control technologies, in which minimum NOx levels on the order of 40 to 50 ppm are achievable, water injection is employed, in a manner known by those skilled in the art, to reduce NOx emissions. Further improvements in NOx emissions have been realized using various forms of DLN technology, however, systems employing this technology have inherent operational restrictions due to combustion instability and combustion dynamic pressures or acoustic noise. Also such systems can operate in low emissions mode only over a very limited gas turbine load range.

BRIEF DESCRIPTION OF THE INVENTION

Some aspects of the present invention therefore provide a low-emission method for producing power using a gas turbine. The method includes premixing a plurality of fuel and air mixtures, injecting the fuel and air mixtures into a combustion chamber using a plurality of fuel nozzles, and adjusting a ratio of fuel and air injected by at least one of the nozzles to control a fuel/air concentration distribution within the combustion chamber.

In other aspects, the present invention provides a gas turbine for producing energy with reduced emission. The gas turbine is configured to premix a plurality of fuel and air mixtures, inject the fuel and air mixtures into a combustion chamber using a plurality of fuel nozzles, and adjust a ratio of fuel and air injected by at least one of the nozzles to control a fuel/air concentration distribution within the combustion chamber.

In yet another aspect, the present invention provides a gas turbine having a combustor with at least one circular combustion chamber. The gas turbine also includes one or more inner fuel nozzles configured to inject a premixed fuel/air mixture into the circular combustion chamber and a plurality of outer fuel nozzles arranged around the one or more inner fuel nozzles and configured to inject premixed fuel/air mixtures into the circular combustion chamber. The gas turbine further includes a set of manifolds configured to provide a richer fuel/air mixture to the one or more inner fuel nozzles than to the plurality of outer fuel nozzles.

Configurations of the present invention will thus be seen to satisfy the latest regulatory requirement for NOx emissions for 50 Hz power equipment without requiring additional treatment of gas turbine exhaust. In addition to reducing NOx emissions, acceptable flame stability and dynamic pressure of allowable magnitude is achieved.

DETAILED DESCRIPTION OF THE INVENTION

Figure 1:
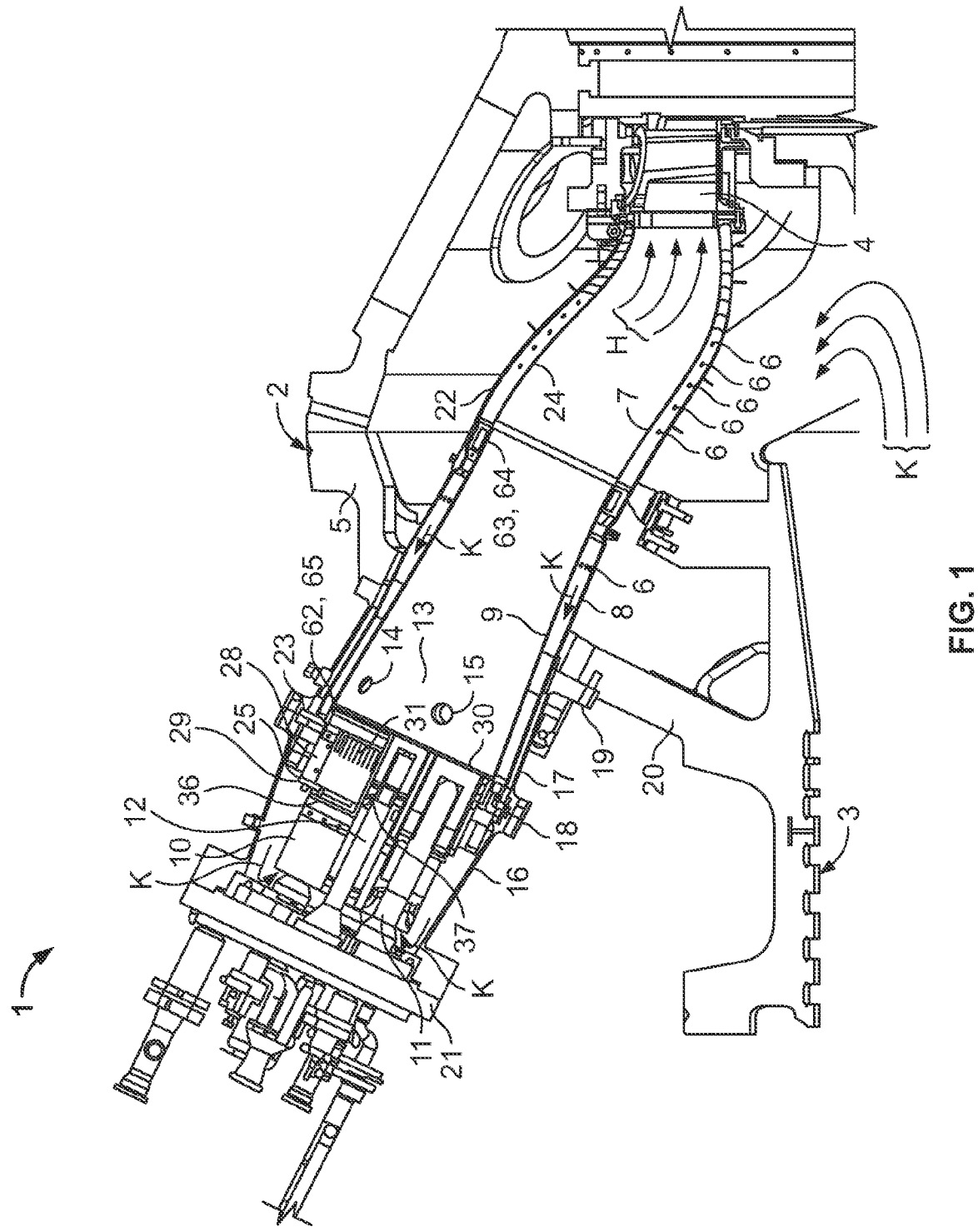
FIG. 1 is a partial cross section of a low NOx gas turbine combustion system.

In some configurations of the present invention, a gas turbine combustion system is provided for a heavy duty industrial gas turbine to achieve one or more advantages. These one or more advantages may include: (a) low NOx and CO emissions as measured at an exhaust plane of the gas turbine; (b) acceptable flame stability in a low emissions operating mode; (c) adequate flame stability at low fuel/air ratios and lean-blow-out margin to achieve low emissions over a broad range of gas turbine load settings (for example, between approximately 35% to 100% of full rated load); and/or (d) low combustion acoustic noise (dynamic pressure fluctuations). Some configurations of the present invention meet or exceed the latest European regulatory standard of 30 mg/Nm$^3$ NOx (approximately 14 ppm @15% oxygen corrected) emissions requirement.

One example of a currently-available gas turbine model useful in conjunction with configurations of the present invention is the General Electric Model MS9001FA F-Class 50 Hz gas turbine. However, configurations of the present invention are also applicable to other gas turbine models produced by other manufacturers, either with or without scaling of physical size and effective flow areas. It will be appreciated that various configurations of the present invention, used in conjunction with such gas turbines, achieve emission levels satisfying European regulatory NOx requirements in a low emissions operating mode. More particularly, when configurations of the present invention are used in conjunction with a General Electric Model MS9001FA F-Class 50 Hz gas turbine, the gas turbine is capable of producing less than 9 ppm NOx (@15% oxygen) over a load range of approximately 35% to 100% of full rated load, as operating tests have confirmed on a single combustor test rig.

Various configurations of the present invention also provide an efficient, fuel-lean, premixed combustion system with respect to bluff-body flame stabilization. Efficient bluff body flame stabilization is achieved utilizing a multiple fuel nozzle and flame holding mechanism arrangement in a gas turbine combustor. The multiple fuel nozzle and flame holding mechanism arrangement in some configurations is duplicated in a plurality of combustion chambers as required in specific applications. This duplication results in the gas turbine operating at low NOx and CO emission levels while maintaining acceptable flame stability. In addition, dynamic pressures are kept low, so that the life of combustion components are not adversely affected.

In some configurations, the relative physical size of fuel nozzle components, the dimensions of the end cap of the round combustion chamber, and the relative size of premixing tubes leading up to and through the end cap of the chamber in which fuel and air are premixed all are selected to achieve a desired combination of emissions capability, sufficient flame stability, and reduced or minimal dynamic pressure fluctuations.

Some configurations of the present invention provide a combustor having at least one circular combustion chamber. A multiple fuel nozzle arrangement installed within the circular combustion chamber. For example, five equally sized fuel nozzles are arranged equally spaced in the combustor at the same distance from the center of the circular combustion chamber. The five equally sized fuel nozzles surround a sixth fuel nozzle at the center of the combustion chamber. The center fuel nozzle is smaller than the surrounding nozzles and is configured differently. A control volume of the combustion chamber is bounded by a tubular combustion liner and by a round end cap. Premixed fuel and air are introduced to the tubular combustion chamber at a plane that coincides with the physical plane of the round end cap. The center fuel nozzle is configured to receive a richer fuel-air mixture than the surrounding fuel nozzles. Some configurations of the present invention control fuel flow through the center fuel nozzle to simultaneously increase combustion stability and reduce emissions. More particularly, use of the center fuel nozzle in combination with the surrounding nozzles achieves an advantageous concentration distribution of fuel/air ratio within the entire combustion chamber. Furthermore, in some configurations, the center fuel nozzle itself is configured to produce its own locally advantageous concentration distribution of fuel/air ratio (as measured radially outward from the center hub to the outer shroud of the premixing tube).

In some configurations of the present invention, a method for introducing fuel and air in stages as a function of gas turbine rotor speed, load setting, and operational mode is provided. The fuel and air are introduced via specific passages of the fuel nozzles in the combustion chamber. Also, in some configurations, the gas turbine combustor has four normal operating modes when operating on gas fuel. These modes support different portions of the operational range of the gas turbine. In some configurations, four gas fuel supply manifolds deliver gas fuel to four separate circuits distributed among the six fuel nozzles arranged in the combustion chamber. In addition, there is a fifth manifold that supplies air at specific times to some gas fuel circuits that are not receiving fuel during some modes of gas turbine combustor operation. One of the four gas fuel manifolds supplies fuel to a diffusion circuit or diffusion manifold. The diffusion manifold supplies fuel to the outer fuel nozzles via diffusion fuel passages, thereby producing stable diffusion flames at ignition, part rotor speed, and zero to low load operation. Three separate gas fuel manifolds also supply fuel to three premixing circuits, namely, Premix 1, Premix 2, and Premix 3. The Premix 1 manifold supplies gas fuel to a single premixing fuel circuit in the center fuel nozzle. The Premix 2 manifold supplies gas fuel to some of the outer fuel nozzle premixing circuits, for example, two of the outer five fuel nozzle premixing circuits. The Premix 3 manifold supplies gas fuel to the remaining outer fuel nozzle premixing circuits, for example, the remaining three of the outer five fuel nozzle premixing circuits.

In some configurations, a low emissions operating mode is provided that is operable at a gas turbine load range of approximately 35% to 100% of rated load. In this mode, the Premix 1, 2, and 3 fuel circuits supply fuel to produce lean premixed combustion flames which yield low NOx emissions while the diffusion circuit is either inactive or purged with air from a purge air manifold. A computer control system modulates, along a predetermined path, the ratio of total gas fuel flow between the Premix 1, Premix 2, and Premix 3 circuits as a function of gas turbine firing temperature over the range of approximately 35% load to 100% load. The modulation is selected to reduce NOx emissions while simultaneously reducing combustion dynamic pressure fluctuations. Outside the low emissions mode range, a combination of diffusion and premix operations occurs between full rotor speed, no load condition and approximately 35% load.

Some configurations of the present invention provide a hula seal between the combustion cap and liner, and between the liner and a transition piece. An inverted arrangement of the hula seals in some configurations provides improved cooling of the attachment welds of the seal to the combustor component with reduced levels of cooling air. The excess cooling air is used in the premixing process to further reduce NOx emissions in some configurations.

In some configurations of the present invention and referring to FIG. 1, a gas turbine 2 is provided with a plurality of combustors 1. (Only a single combustor 1 is shown in FIG. 1, and it is shown in cross-section.) A compressor 3 (partially shown) is also provided. Gas turbine 2 is represented in FIG. 1 by a single turbine nozzle 4. Turbine and compressor rotors are connected by a single common shaft (not shown in the Figures). In operation, a portion of the total compressor air flows from the exit of the compressor diffuser (i.e., inlet holes 6) to the combustor 1 in a reverse direction relative to the direction of air flow through the compressor and turbine sections, where it is used to cool the combustor and to supply air to the combustion process.

Gas turbine 2 includes a plurality of combustors 1 arranged in an annular array about the periphery of the gas turbine casing 5. High pressure air H from compressor 3 flows into combustors 1 through an array of air inlet holes 6 distributed among a transition piece 7 and a flow sleeve 8 near a outlet end of combustor liner 9. Compressed air delivered to combustor 1 flows through an annular passage bounded by combustor flow sleeve 8 and combustor liner 9 to a combustor inlet end (or synonymously, head end) 10 where there are arranged a plurality of air-fuel injectors of two different types. For example, in some configurations, the plurality of air-fuel injectors comprise an array of five outer fuel nozzles 11 and a single center nozzle 12 per combustor 1. Not all configurations have the same number of inner nozzles or the same number of outer nozzles as that described herein. By way of example only, some configurations include more than one center nozzle 12 surrounded by a different number of outer nozzles 11 than that described herein.

At an inlet end of each combustor, compressed air and fuel are mixed and flow into a combustion burning zone 13. Ignition is initially achieved when the starting sequence of gas turbine 2 is executed in combustors 1 by one or more spark plugs (not shown) in conjunction with cross fire tubes 15 (one shown). The one or more spark plugs extend through an equivalent number of ports 14 in combustor liner 9 The spark plugs are subsequently retracted from combustion burning zone 13 once a flame has been continuously established. At the opposite end of combustion burning zone 13, hot combustion gases H flow into a double-walled transition piece 7 that connects an outlet end of each combustor liner 9 with an inlet end of turbine nozzle 4 to deliver hot combustion gas flow H to turbine 2, where the enthalpy of the hot gas flow is converted to shaft work in the turbine rotor via the expansion of gas flowing through stationary and rotating turbine airfoils (not shown in the Figures).

Figure 6:
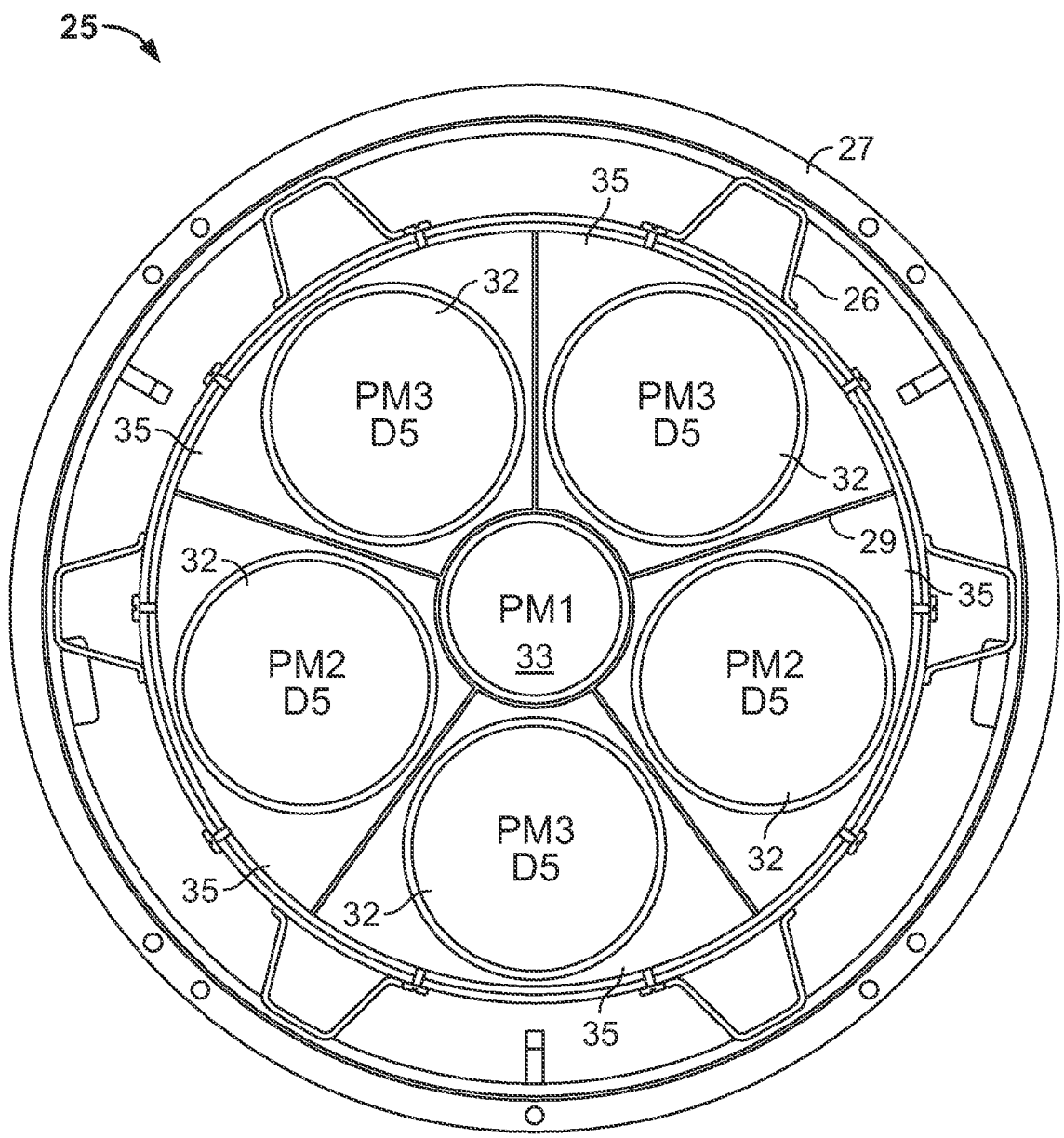
FIG. 6 is a forward end view of a combustion liner cap assembly.
Figure 7:
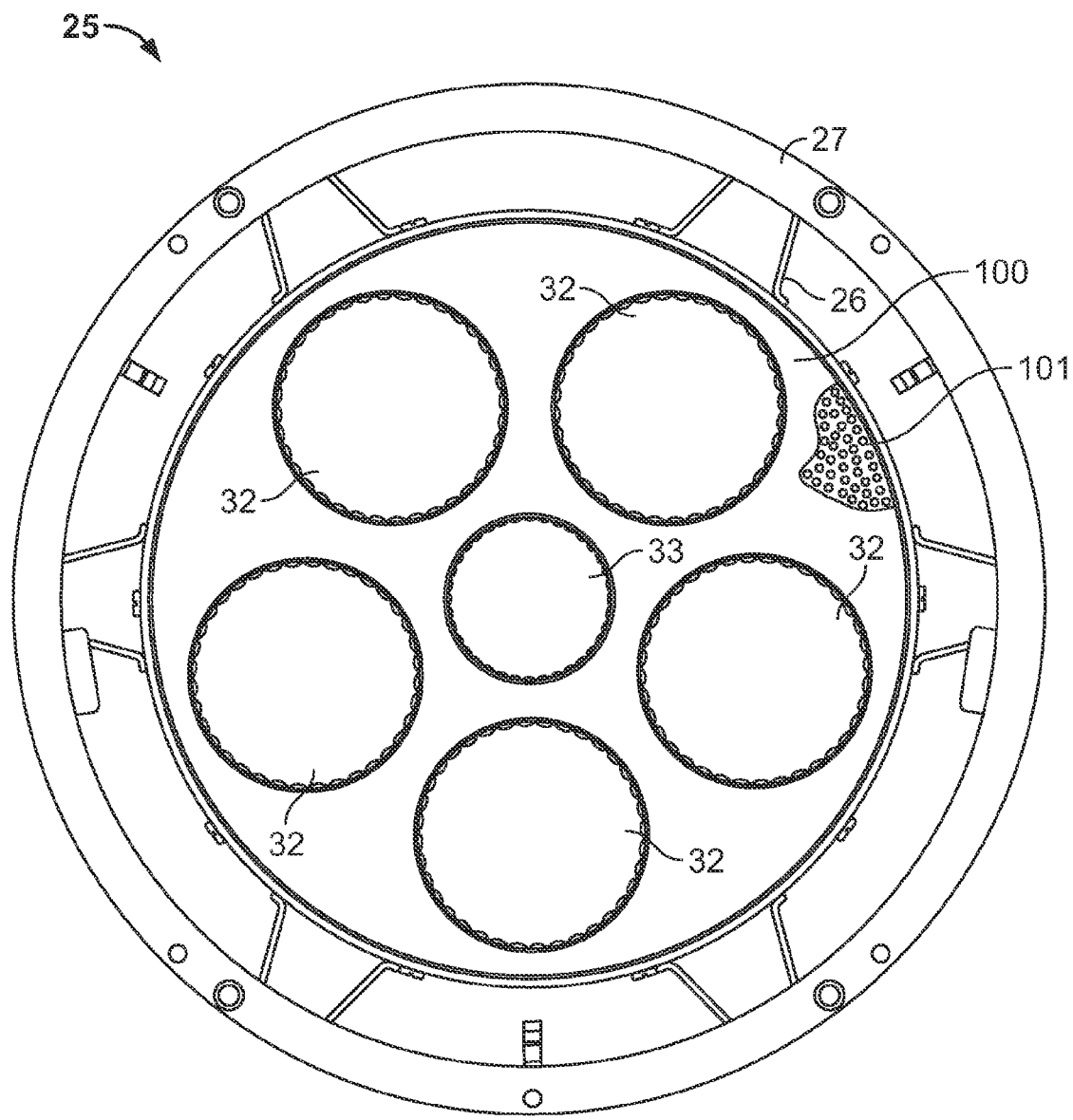
FIG. 7 is an aft end view of a combustion liner cap assembly.

Each combustor 1 includes a substantially cylindrical combustion casing assembly comprising two sections, namely, a forward combustion casing 16 and an aft combustion casing 17. Combustion casings 16 and 17 are attached to compressor discharge casing 20 by a bolted joint 19. Forward combustion casing 16 is connected to aft combustion casing 17 by bolted joint 18. The head end of forward combustion casing 16 is closed by an end cover assembly 21 that may also include fuel and air supply tubes, manifolds and associated valves for feeding gas, liquid fuel, air, and water (if desired) to combustor 1 as described in greater detail below. In some configurations of the present invention, end cover assembly 21 is configured as a mounting base to receive a plurality (for example, five) outer fuel nozzle assemblies 11 arranged in an annular array about a longitudinal axis of combustor 1. Referring to FIGS. 6 and 7, the array of outer fuel nozzle assemblies 11 is arranged around a center fuel nozzle assembly 12 that is smaller (in terms of size, air and fuel flow capacity) than outer fuel nozzles 11.

Again referring to FIG. 1, a substantially cylindrical flow sleeve 8 is concentrically mounted in the combustion casings 16 and 17. Flow sleeve 8 connects at its aft end to outer wall 22 of a double walled transition piece 7. Compressor air flows through an outer passage of the double walled transition piece 7, over and through flow sleeve 8, and to the combustor 1 head end 10. Flow sleeve 8 is connected at its forward end by means of a radial flange 23 to aft combustor casing 17 at a bolted joint 18 where forward combustion casing 16 and aft combustion casing 17 are joined.

In some configurations of the present invention, flow sleeve 8 is concentrically arranged with a combustor liner 9 which is connected at one end with inner wall 24 of transition piece 7. Referring to the forward end view of combustion liner cap assembly 25 in FIG. 6, the opposite (forward or head) end of the combustor liner 9 is supported by a combustion liner cap assembly 25 which is, in turn, supported within the combustor casing by a plurality of struts 26 and an associated mounting flange assembly 27. Outer wall 22 of transition piece 7, as well as a portion of flow sleeve 8 extending aft of the location at which aft combustion casing 17 is bolted to compressor discharge casing 20, are formed with an array of apertures or inlet holes 6 over their respective peripheral surfaces to permit air to reverse flow from the compressor 3 through the apertures 6 into the annular space between flow sleeve 8 and combustor liner 9 toward the upstream or head end 10 of combustor 1 (as indicated by the flow arrows K shown in FIG. 1).

Referring again to FIG. 1, combustion liner cap assembly 25 supports a plurality of pre-mix tube assemblies 28, one mounted concentrically about each fuel nozzle assembly 11 and 12. Each pre-mix tube assembly 28 is supported within combustion liner cap assembly 25 at its forward and aft ends by forward plate 29 and aft plate 30, respectively, each provided with openings aligned with the open-ended pre-mix tube assemblies 28. Each pre-mix tube assembly 28 comprises an assembly of two tubes separated by a pre-mix tube hula seal 31, which permits the dual-tube assembly to change in length as combustion liner cap assembly 25 expands thermally from cold non-running conditions to hot operating conditions. In other words, as the distance between forward support plate 29 and aft support plate 30 changes due to thermal expansion of the overall assembly, the pre-mix tube assemblies 28 are free to expand accordingly along an axis of symmetry.

In some configurations and referring to forward end view of combustion liner cap assembly 25 of FIG. 6, combustion liner cap assembly 25 includes openings 32 (for outer fuel nozzles 11 and their premix tubes) and openings 33 (for center fuel nozzle 12 and its premix tube) in forward support plate 29. In some configurations, forward support covers 35 are included and are mounted to forward support plate 29. Forward support covers 35 aid in securing each of the outer premix tubes on the forward end. Referring to the aft end view of combustion liner cap 25 in FIG. 7, a similar structure as described in reference to FIG. 6 supports premix tubes for the inner and outer fuel nozzles, however, additional features may include an impingement plate 100 having an array of effusion cooling apertures 101. Cooled impingement plate 100 functions as a radiation shield for cap assembly 25 to shield it from radiation heat release resulting from combustion during operation in adjacent combustion burning zone 13 (FIG. 1).

In some configurations and again referring to FIG. 1, aft plate 30 of combustion liner cap assembly 25 mounts to a plurality of forwardly extending floating collars 36 (one for each pre-mix tube assembly 28, arranged in substantial alignment with the openings in aft plate 30), each of which supports an air swirler 37 (also referred to herein as a "swirling vane") which is, for example, integrally formed in fuel nozzles 11 and 12 (also referred to herein as "fuel injection nozzles," "fuel injectors," or "fuel nozzle assemblies"). The arrangement is such that air flowing in the annular space between combustor liner 9 and flow sleeve 8 is forced to reverse direction at combustor inlet end 10 of combustor 1 (between end cover assembly 21 and combustion liner cap assembly 25) and to flow through air swirlers 37 and pre-mix tube assemblies 28. Fuel passages integrally manufactured into each of air swirlers 37 deliver fuel through an arrangement of apertures that continuously introduce gas fuel, depending upon the operational mode of gas turbine 2 into the passing air, thereby creating a fuel and air mixture that is subsequently and continuously ignited in combustion burning zone 13.

Figure 2:
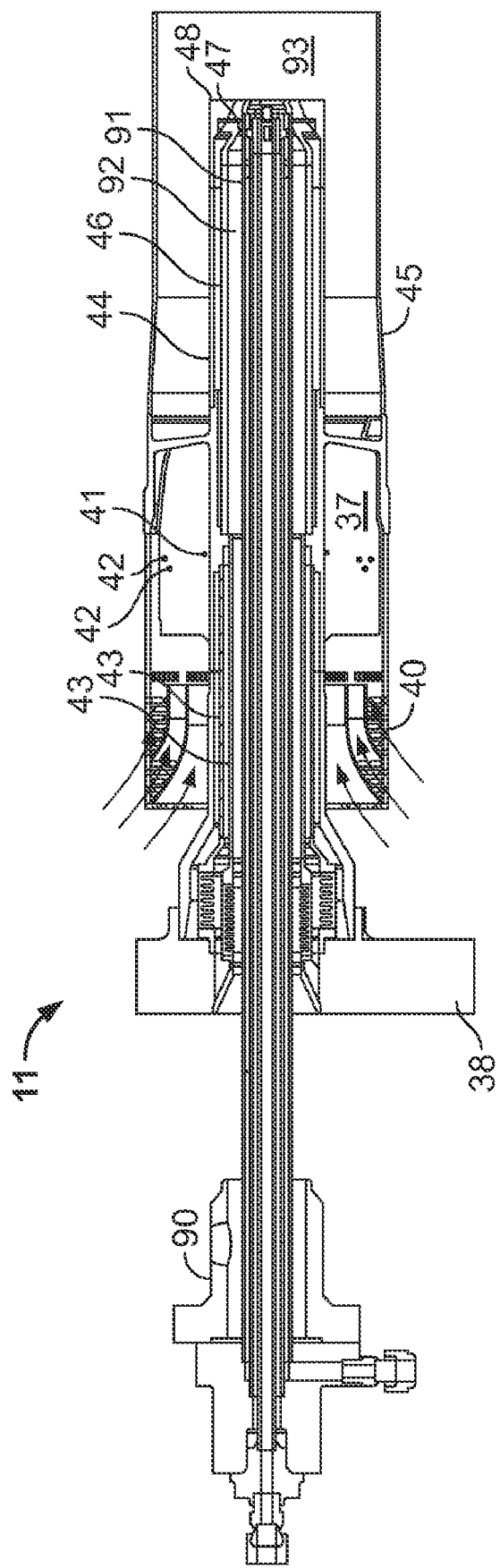
FIG. 2 is sectional view of an outer fuel injection nozzle such as those shown in FIG. 1.
Figure 3:
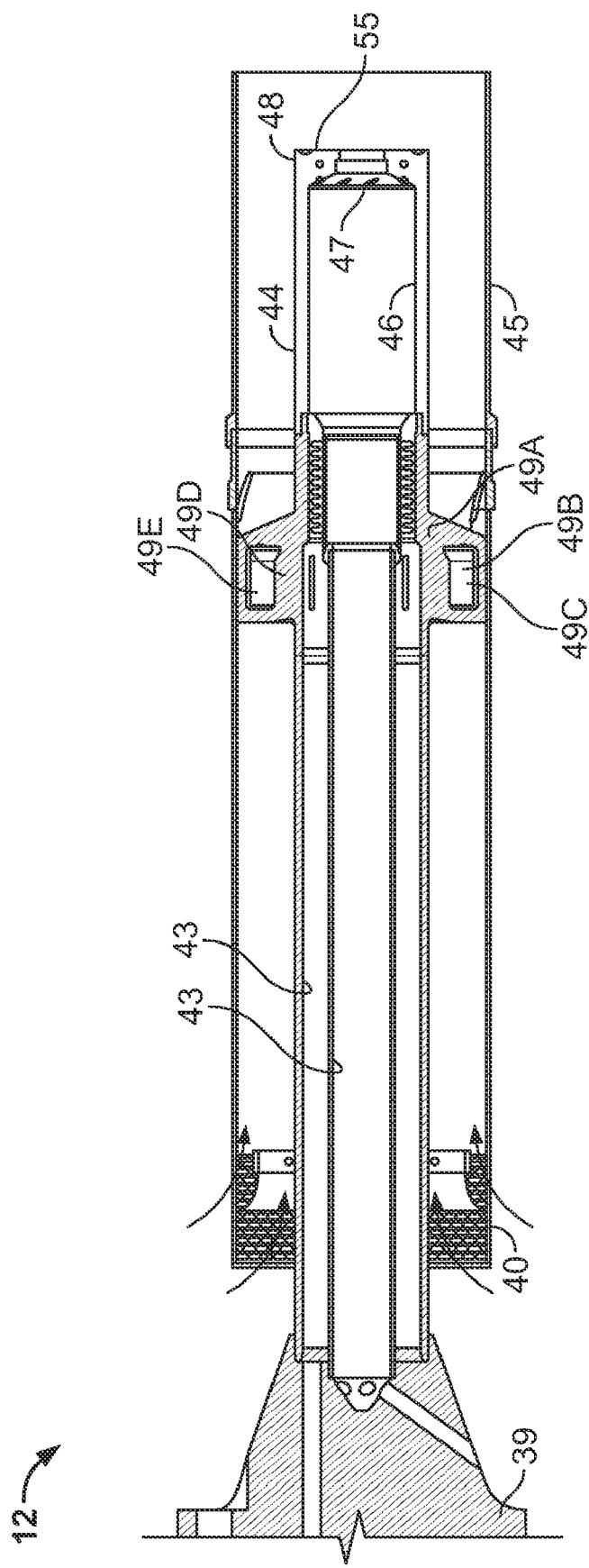
FIG. 3 is a sectional view of an inner fuel injection nozzle such as that shown in FIG. 1.

FIG. 2 is a cross-sectional view of an outer fuel injection nozzle 11 shown in FIG. 1. FIG. 3 is a cross-sectional view of center fuel injection nozzle 12 shown in FIG. 1. Each fuel injector nozzle 11 and 12 includes a flange assembly 38 and 39, respectively (shown in FIGS. 2 and 3, respectively) that attaches by a sealed and bolted joint assembly to the inside of end cover assembly 21 (shown in FIG. 1). Fluids including, but not necessarily limited to gas fuel and purge air, are supplied to passages of gas fuel injection nozzles 11 and 12. These fluids are supplied through flange assembly 38 and flange assembly 39, respectively, having previously passed through piping manifold assemblies (not shown). End cover assembly 21 is thus supplied with fuels and other working fluids that are delivered via fuel nozzles 11 and 12 in a precise fashion into combustion burning zone 13 (shown in FIG. 1). A liquid fuel and water injection cartridge 90 shown in FIG. 2 attaches to the outside of end cover assembly 21 (FIG. 1). Liquid fuel and water injection cartridge 90 is installed within each outer gas fuel injection nozzle 11. In some configurations which can burn liquid fuel as an alternative to gas fuel, a liquid fuel mode of operation is provided. This liquid fuel mode delivers sprays of liquid fuel and water into combustion burning zone 13 via liquid fuel and water injection cartridge 90. This is not considered a low emissions mode of operation for purposes of the present invention. In some configurations in which a liquid fuel mode of operation is not required, another configuration (not shown) of liquid fuel and water injection cartridge 90 is provided that is not configured to pass liquid fuel or water, but which occupies an equivalent space within gas fuel injection nozzle 11.

Again referring to FIG. 2, outer gas fuel nozzle 11 includes a sheet metal screen or inlet flow conditioner 40 that has an array of holes and guide vanes that create a drop in pressure and provide direction guidance for incoming air supplied to combustor chamber inlet or head end 10. Air that passes through inlet flow conditioner 40 is subsequently mixed with gas fuel through a plurality of swirling vanes 37, each of which has integral passages leading to inner premix gas injection holes 41 (inner premixing holes) and outer premix gas injection holes 42 (outer premixing holes). Concentric tube assemblies 43 are arranged in fuel nozzles 11 to form independent fuel passages allowing control of fuel flow split between inner premix gas injection holes 41 and outer premix gas injection holes 42. This inner and outer flow division of gas fuel in the outer fuel nozzle assemblies 11 allows direct control of the concentration distribution of premixed fuel and air as measured radially from a hub 44 of each fuel nozzle 11 or 12 to a shroud 45 of each fuel nozzle 11 or 12. Methods used to actively or passively deliver a gas fuel supply that divides the gas fuel flow upstream prior to entering fuel nozzle flange assembly 38 between inner and outer premix passages can be selected as a design choice depending on design requirements of a specific gas turbine application. Methods that allow the concentration distribution of premixed air and fuel to be adjusted to a predetermined value within one or more fuel nozzles as a function of gas turbine 2 operating conditions (such as the methods described herein) can be used to produce minimal NOx emissions along with minimal combustion dynamic pressures.

In some configurations and referring again to FIG. 1 and FIG. 2, an additional annular passage 92 is formed by an inner diameter of wall 46 and an outer diameter 91 of liquid fuel and water injection cartridge 90 (or a blank counterpart, not shown, that does not pass fluid but occupies the same or an equivalent space). Annular passage 92 leads to an array of diffusion fuel metering holes 47. Diffusion fuel metering holes 47 and annular passage 92 are supplied with gas fuel and enable the direct injection of gas fuel into combustion burning zone 13 and the production of a diffusion-type combustion flame that is stabilized in a recirculation zone 93 immediately downstream of fuel nozzle aft tip 48. As a result, diffusion combustion can be used as a stabilization feature of the combustion system at ignition and low load conditions. Diffusion combustion as a stable pilot flame can be used with or without simultaneous premixed combustion in various desired combinations, all of which occurs in combustion burning zone 13 of combustor liner 9 downstream of aft plate 30 of combustion liner cap assembly 25.

In some configurations and referring to FIG. 3, smaller center fuel nozzle 12 is similar in design features to outer fuel nozzles 11, except that center fuel nozzle 12 does not contain separate passages for inner and outer premix gas fuel and does not contain a liquid fuel and water injection cartridge or a blank counterpart as do outer fuel nozzles 11. Among other functions, center fuel nozzle 12 provides and maintains stability of the overall combustion flame structure in combustion burning zone 13. An overall flame structure in some configurations may comprise combusting fuel and air introduced by all six fuel nozzles 11 and 12, depending upon the operating mode and the load setting of the gas turbine. By maintaining a slightly higher average fuel to air ratio from center fuel nozzle 12 than outer fuel nozzles 11, outer fuel nozzles 11 are provided with a more stable ignition source as the premixed fuel and air mixture from outer nozzles 11 interact with the center fuel and air combusting mixture produced by center nozzle 12 in common combustion burning zone 13. Center fuel nozzle 12 can be used as a combustion stability anchor. Thus, although center fuel nozzle 12 itself may produce relatively more NOx emissions than outer fuel nozzles 11, the stabilizing effect of center fuel nozzle 12 allows the majority of the fuel/air ratio for the entire combustor to be relatively low so that overall NOx emissions can be controlled at minimal levels. Thus, some configurations of the present invention realize an advantageous trade-off between NOx emissions and stability.

Figure 4:
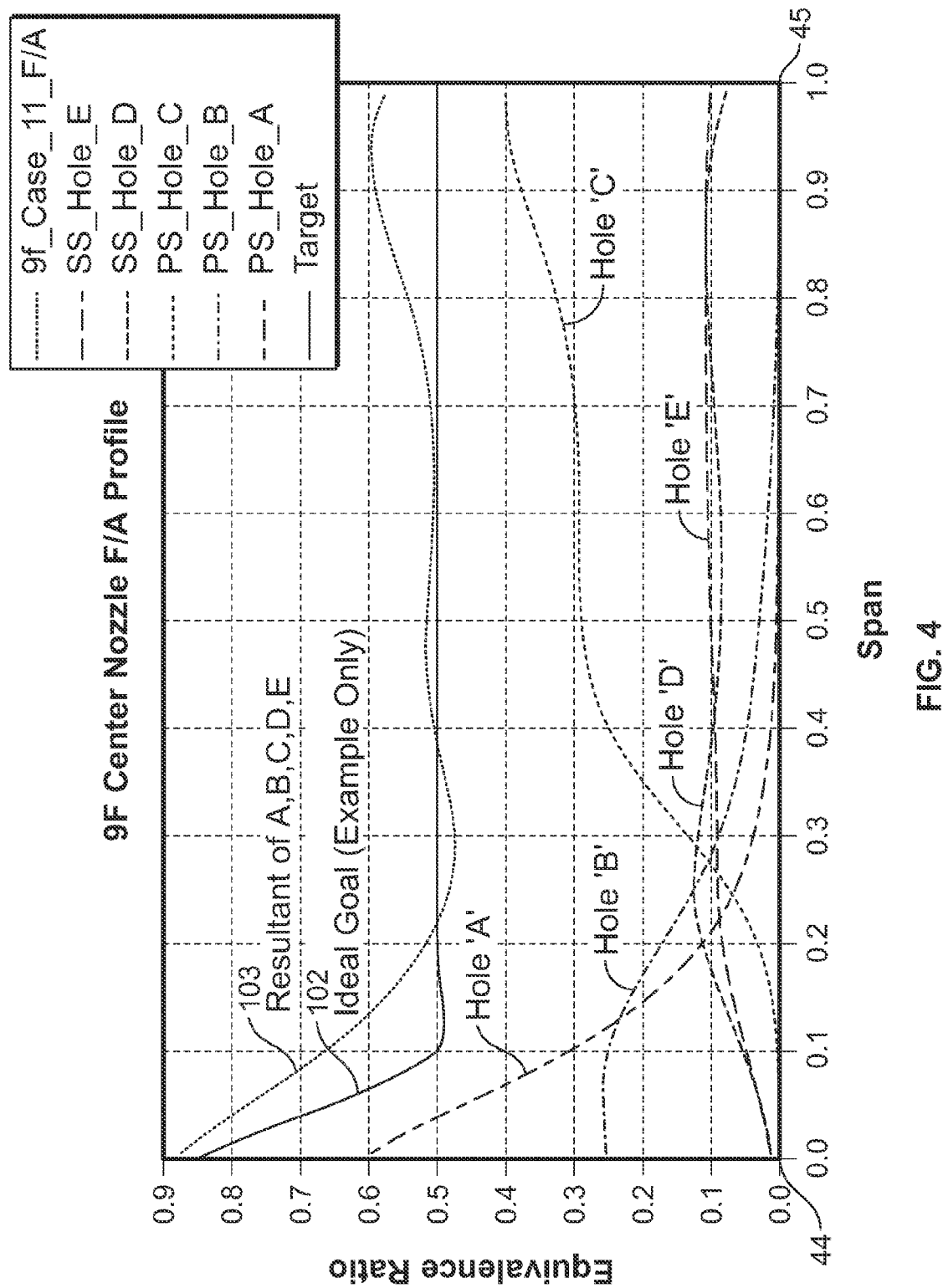
FIG. 4 is a graph showing a computed profile of fuel/air equivalence ratio as a function of radial distance between a hub and a shroud, as measured at an exit plane, for the inner fuel injection nozzle shown in FIG. 3.

In some configurations and referring to FIGS. 3 and 4, an optimum placement and size of premix gas metering holes for the center fuel nozzle 12 can be achieved using computational methods to determine optimum fuel/air concentration profile as measured from hub 44 to shroud 45. Computational methods can be used to establish a target fuel/air, or equivalence ratio profile as measured radially from hub 44 to shroud 45. For example, for one configuration of the present invention, Table 1 below lists diameters, absolute radial positions, mechanical areas, gas fuel flows per hole, and effective flow areas for holes A, B, C, D, and E (denoted collectively as holes 49).

TABLE 1

CENTER NOZZLE SECTOR MODEL GAS HOLE SIZE ANALYSIS (PM 1% 9.4 HEVP)

| Side | Hole | Hole Diameter (cm) | Radial Location (cm) | Area (cm$^2$) | Gas Fuel Flow (g/sec) | Effective flow area (cm$^2$) |
|---|---|---|---|---|---|---|
| Pressure | A | 0.10922 | 2.8067 | 0.0093548 | 0.93440 | 0.0063548 |
|  | B | 0.10922 | 3.3350 | 0.0093548 | 0.92986 | 0.0063548 |
|  | C | 0.21336 | 4.2062 | 0.0369677 | 2.90753 | 0.0251161 |
| Suction | D | 0.11938 | 3.683 | 0.0111613 | 1.12945 | 0.0075935 |
|  | E | 0.12446 | 3.9726 | 0.0121290 | 1.12037 | 0.0082516 |
|  |  |  |  | TOTAL... | 7.02161 | 0.0536708 |

The graph of FIG. 4 represents the computed profile of fuel/air equivalence ratio as a function of radial distance between hub 44 and shroud 45, as measured at an exit plane 55 of the tube. An "equivalence ratio" is defined as a ratio of the actual fuel/air ratio divided by the stoichiometric fuel/air ratio for a fuel under consideration. This computation (or virtual measurement within a computer model) of the equivalence ratio at exit plane 55 of fuel nozzle 12 can be performed using commercially available computational fluid dynamics software running on a suitable computer or workstation.

As shown in FIG. 4, each radial equivalence ratio profile resulting from fuel being introduced into the passing air by holes A, B, C, D, and E on an individual basis has a unique shape. An ideal target profile 102 for best performance of center fuel nozzle 12 is indicated. A resultant overall equivalence ratio profile 103 resulting from the combination of holes A, B, C, D, and E is shown, and is approximately the same as the target goal.

Methods to achieve a desired equivalence ratio profile as produced at the exit of a premixing gas fuel nozzle device such as fuel nozzle 12 can be applied to gas turbines such as gas turbine 2 to achieve low emissions. The method includes constructing a computational fluid dynamics model of a fuel nozzle such as the center fuel nozzle 12 of the exemplary configurations described herein. The model is parameterized with gas fuel and air flow, temperature, and pressure conditions. For example, thermal, pressure, and flow conditions that are expected in actual operation of the gas turbine are established for setting up the computational model. A Design of Experiments (DOE) model is constructed to determine the parameters such as those shown in Table 1 and to relate the parameters to the size and placement of gas injection holes. Several iterations or modulations of the design parameters are conducted to exercise the computational fluid dynamic model. Results of the model are evaluated at a desired plane, for example, plane 55 of FIG. 3. The computational solution and any deviation from the desired target equivalence ratio profile are evaluated to determine whether the results meet desired specifications. If not, the method can be iterated with different parameters or with a different fuel nozzle configuration. Prototype parts can be built using the results of the model. The prototype parts can then be validated experimentally.

Figure 5:
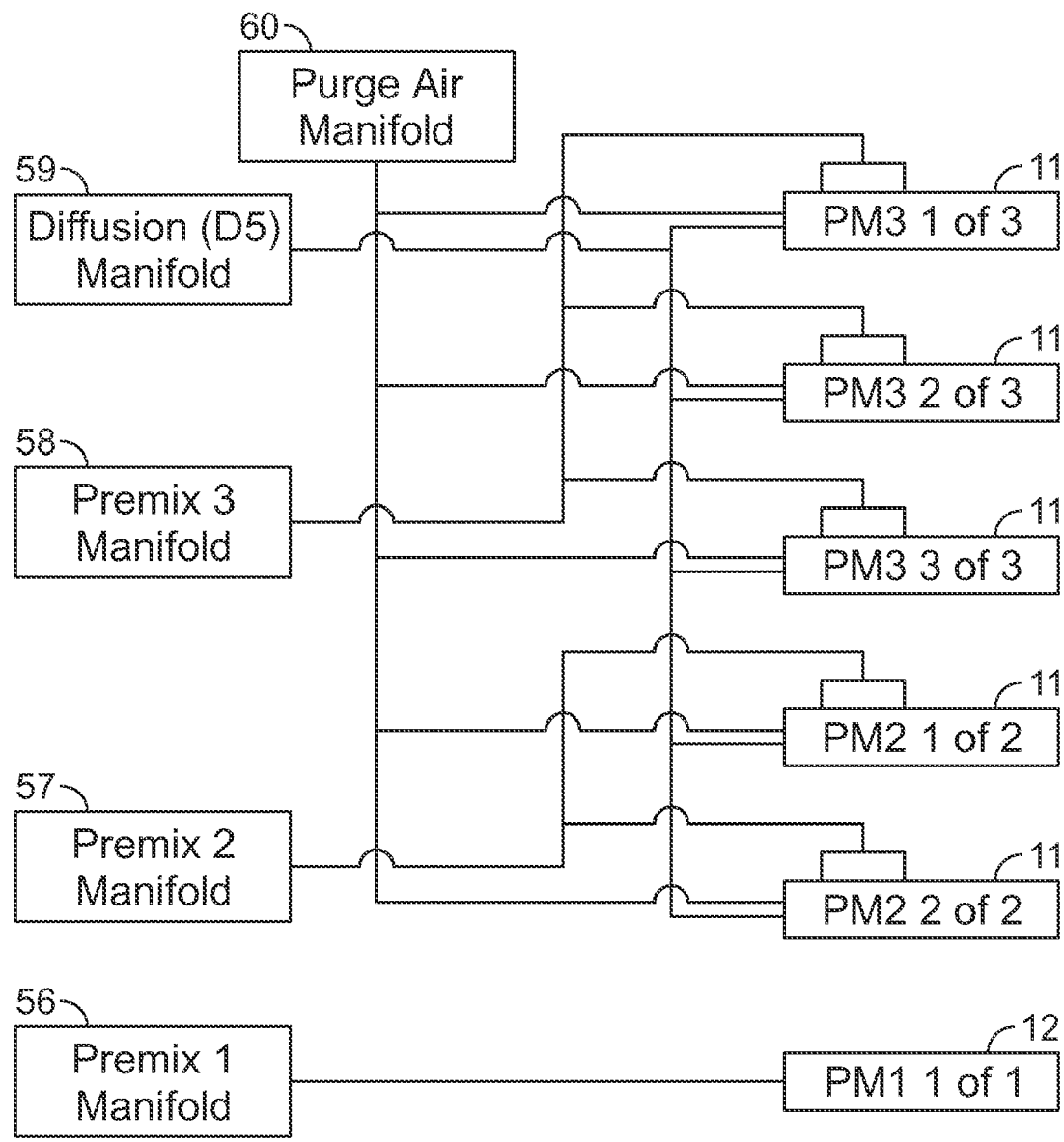
FIG. 5 is a gas fuel system schematic diagram of a modified General Electric DLN 2.6+ Dry Low NOx combustion system.

FIG. 5 is a gas fuel system schematic diagram of a modified General Electric DLN 2.6+ Dry Low NOx combustion system. In some configurations, four gas fuel supplying manifolds 56, 57, 58, and 59 supply fuel that is ultimately introduced to combustor 1 via premix gas injection holes 41 and 42 and diffusion holes 47 of outer fuel nozzles 11, and to premix gas fuel holes 49 in center fuel nozzle 12 (see FIG. 2 and FIG. 3). Premix 1 manifold 56 supplies fuel to center fuel nozzle 12. Premix 2 manifold 57 supplies fuel for premixing to two of the five outer fuel nozzles 11 arranged relative to combustion liner cap assembly 25 as shown in FIG. 5. Premix 3 manifold 58 supplies fuel for premixing to three of five outer fuel nozzles 11 arranged relative to combustion liner cap assembly 25 as shown in FIG. 5. A diffusion, or D5 manifold 59 supplies fuel for the five diffusion gas passages that are present in the five outer fuel nozzles 11. Purge air for passages which do not receive a fuel supply in all modes of operation is supplied to the five outer fuel nozzles 11 via purge air manifold 60 and associated pipes and valves (not shown).

Configurations of a fuel delivery and staging system represented in FIG. 5 have been analyzed and tested. Design analysis and testing have shown such configurations to provide adequate asymmetric fuel staging flexibility within combustion burning zone 13 (shown in FIG. 1) to achieve stability, a reduction in NOx emissions, and reduced dynamic pressure fluctuations during low emissions premixed operating modes. The flexibility of such fuel staging and delivery system configurations can provide additional gas turbine operational benefits across the operating range of the machine, depending upon the application, which may include but are not limited to the ability to limit or reduce low load visible yellow plume NOx emissions due to diffusion combustion, as well as improve low load premix operation NOx capability over known fuel delivery and staging systems.

As applied to GE model MS9001 FA gas turbine and referring to the gas fuel schematic of FIG. 5, exemplary configurations of combustor 1 represented in FIG. 1 can have at least four or more normal operating modes on gas fuel. These modes are configured to support different portions of the operational range of gas turbine 2. Combustor 1 is ignited and a turbine rotor accelerated to 95% speed in diffusion mode, with the diffusion (D5) manifold 59 supplying gas fuel to diffusion circuits of the five outer fuel nozzles 11. In diffusion mode, the other three premix gas fuel manifolds 56, 57, and 58 and purge air manifold 60 do not necessarily supply fuel or air, although working fluids for these circuits can be in a pre-operational state in preparation for transitioning to modes of operation in which these manifolds are engaged. At approximately 95% turbine rotor speed condition, a transition to sub-piloted premix mode occurs. This transition initiates fuel flow in premix 1 fuel circuit or manifold 56, allowing the rotor to achieve a full speed condition (100% speed) with minimal or reduced load application to the turbine rotor. This operational sequence provides constant fueling of premix 1 fuel manifold 56 for all rotor speeds and loads greater than the 95% speed, no load condition. As a result, premix 1 fuel manifold 56 does not require purge air at any time during operation. During sub-piloted premix mode, purge air is supplied to premix 2 fuel manifold 57 and premix 3 fuel manifold 58. At a preselected gas turbine reference firing temperature condition between 100% rotor speed up to a minimal load condition, another mode transition to a piloted premix mode is initiated as premix 3 manifold 58 begins fueling combustor 1 while premix 2 manifold 57 continues to be air purged. In piloted premix mode, diffusion manifold 59, premix 1 manifold 56, and premix 3 manifold 58 are all fueled. Piloted premix is a very stable, non-low emissions mode, and gas turbine 2 can be operated over the entire load range in this mode, if desired, when greater than normal stability is required and emissions somewhat higher than the lowest achievable can be tolerated.

At approximately 35% load or higher, a mode transition to premix mode is scheduled. In this low emissions mode of the operation sequence, low NOx emissions benefits are fully realized. In premix mode, low emissions are achieved via fuel flow scheduling as a function of gas turbine 2 reference firing temperature to only premix 1, 2, and 3 manifolds 56, 57, and 58, respectively, while diffusion manifold 59 is no longer fueled but is purged with air. In premix mode, as the split of total fuel flow is modulated as a function of reference firing temperature to the premix fuel manifolds 56, 57, and 58, the flow of purge air through diffusion manifold 59 is also modulated and scheduled as a function of reference firing temperature. Low emissions, acceptable flame stability, and low dynamic pressures are simultaneously realized as a result of the ability of the fuel system to control axisymmetric fuel staging within combustion burning zone 13 (FIG. 1) and purge air scheduling as a function of reference gas turbine firing temperature.

In some configurations and referring to FIG. 1, a hula seal 65 is used to seal an annular gap between combustion liner cap assembly 25 and combustor liner 9 at an interface 62. A hula seal 64 is also used to seal a gap between combustor liner 9 and an inner wall 24 of transition piece 7 at an interface 63. A hula seal such as 64 or 65 is generally described, without reference to its specific application, as a system of leaf springs formed into a round hoop used to seal a sliding interface joint or annular gap between two concentric round ducts through which the same fluid is passed from one duct through to the other. Various hula seal configurations are applied in sealing gaps between round adjoining ducts in various locations of combustor 1 of gas turbine 2 as shown in FIG. 1. For example, as described above, a hula seal 31 is used in some configurations of pre-mix tube assemblies 28 to maintain a seal despite thermal expansion of combustion liner cap assembly 25.

Figure 8:
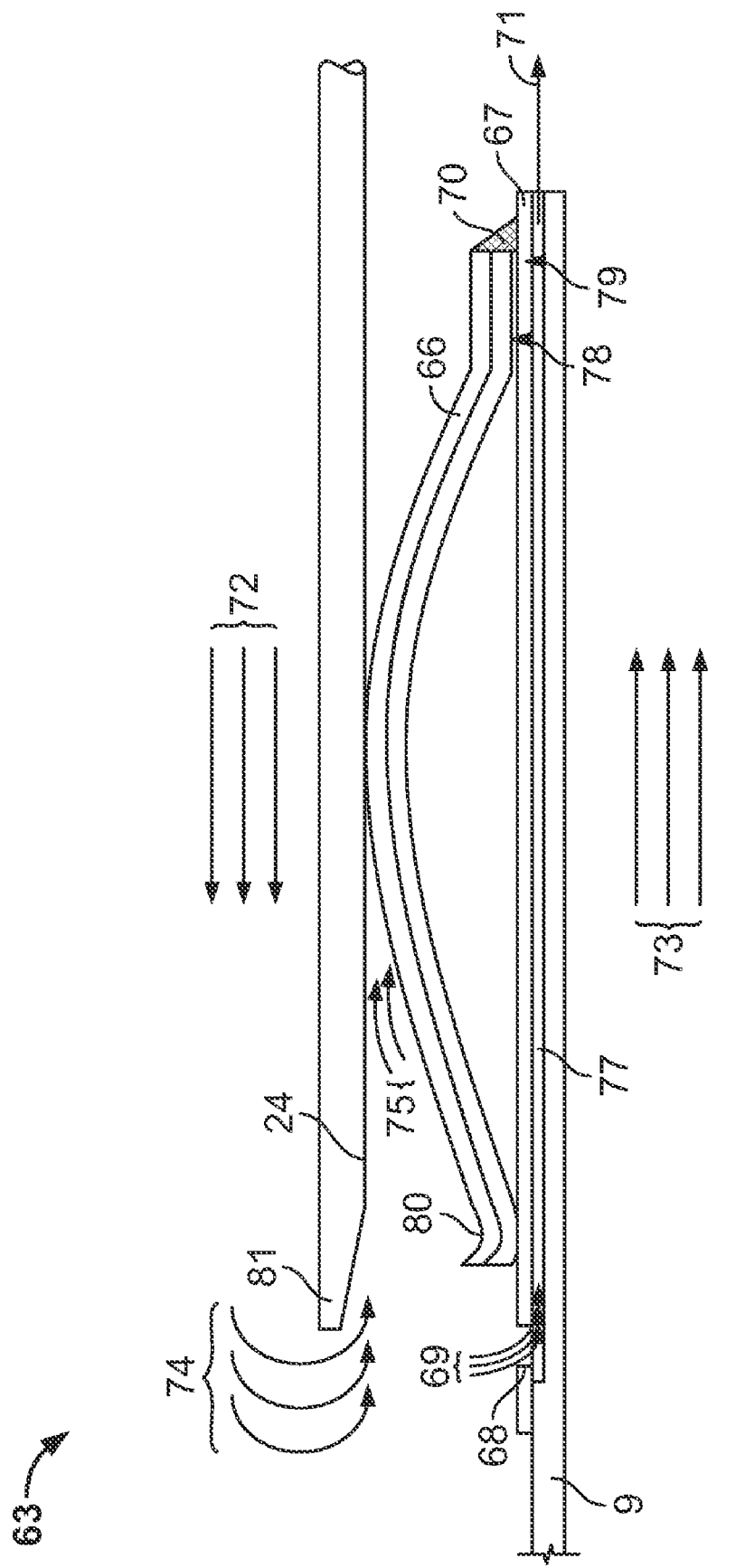
FIG. 8 is a view of a prior art hula seal and mating duct configuration in a cross sectional plane.

A prior art hula seal 66 and mating duct configuration is represented in FIG. 8 in a cross-sectional plane similar to that shown in FIG. 1. FIG. 8 is representative of an interface 63 (FIG. 1) as it might appear were it to incorporate a prior art hula seal 66 between combustor liner 9 and the inner wall 24 of transition piece 7. In various configurations of the present invention and referring to FIG. 9, interface 63 is provided with an inverted hula seal 82 and mating duct. Inverted hula seal 82 configurations efficiently minimize leakage of combustion air flowing toward head end 10 of combustor 1 (FIG. 1). Conservation of air at interfaces such as 63 facilitates the reduction of NOx emissions from combustor 1 (FIG. 1).

Referring again to FIG. 8, a prior art hula seal 66 is shown attached by weld 70 to a cooling channel shroud 67 at the aft end of combustor liner 9. A small portion of compressor air flow 72 flowing toward the head end 10 of combustor 1, and generally parallel to interface 63, tends to follow a leakage path indicated by leakage flow arrows 74 past an outer bowed portion of hula seal 66 as further indicated by leakage flow arrows 75. Leakage flows 74 and 75 result from a differential pressure during gas turbine operation between compressor air flow 72 on the outside of the liner 9 and hot gas flow 73 inside the liner 9. Compressor air flow 72 is at a relatively higher static pressure and lower temperature than hot gas flow 73, which contains post combustion products and is in a state of relatively higher temperature and lower static pressure than compressor air flow 72.

For a prior art hula seal 66 configuration, seal 66 is typically mounted to an outside diameter of the inner mating duct, for example, the outside diameter of cooling channel shroud 67 in FIG. 8. Prior art hula seal 66 inner mounting diameter 78 adjacent to the attachment weld 70 is provided with appropriate clearance to match the mating duct outer mounting diameter 79. During assembly of combustor 1 (FIG. 1), a liner 9 having a hula seal 66 preinstalled is assembled into inner wall 24 of transition piece 7 in the same direction as hot gas flow 73 relative to inner transition piece wall 24. In the prior art configuration shown in FIG. 8, tips of hula seal fingers 80 face opposite the direction of installation, or in the same direction as compressor air flow 72. Thus, tips of hula seal fingers 80 do not get caught on leading edge 81 of inner transition piece wall 24 during assembly. Tips of hula seal fingers 80 in this configuration are subject to a relatively cooler thermal condition than hula seal attachment weld 70 during gas turbine operation. Hula attachment weld 70 is placed in this configuration in the vicinity of a backward facing step at the exit plane of liner 9, and is therefore subject to thermal conditions resulting from the passage of hot gas flow 73 during gas turbine operation.

To maintain structural integrity of hula seal weld 70 and of prior art hula seal 66 itself, and to provide required cooling to the aft end of liner 9, a small heat exchanger is present in the aft end of liner 9. This heat exchanger includes a plurality of cooling channels 77 distributed around a circumference of liner 9. Compressor air enters through a plurality of entrance holes 68 and subsequently flows into cooling channels 77 as indicated by cooling air flow arrows 69. The compressor air cooling flow entering the heat exchanger is driven by differential static pressure between compressor air flow 72 and hot gas flow 73 and exits at the opposite end of the channel indicated by flow arrow 71. Although the cooling air flow 69, 71 through the channel is beneficial to the thermal and structural integrity of hula seal 66 and hula seal weld 70, this flow can be characterized as a controlled leakage that does not participate in the combustion process. The introduction of this controlled leakage tends to increase NOx emissions of combustor 1 (FIG. 1).

Figure 9:
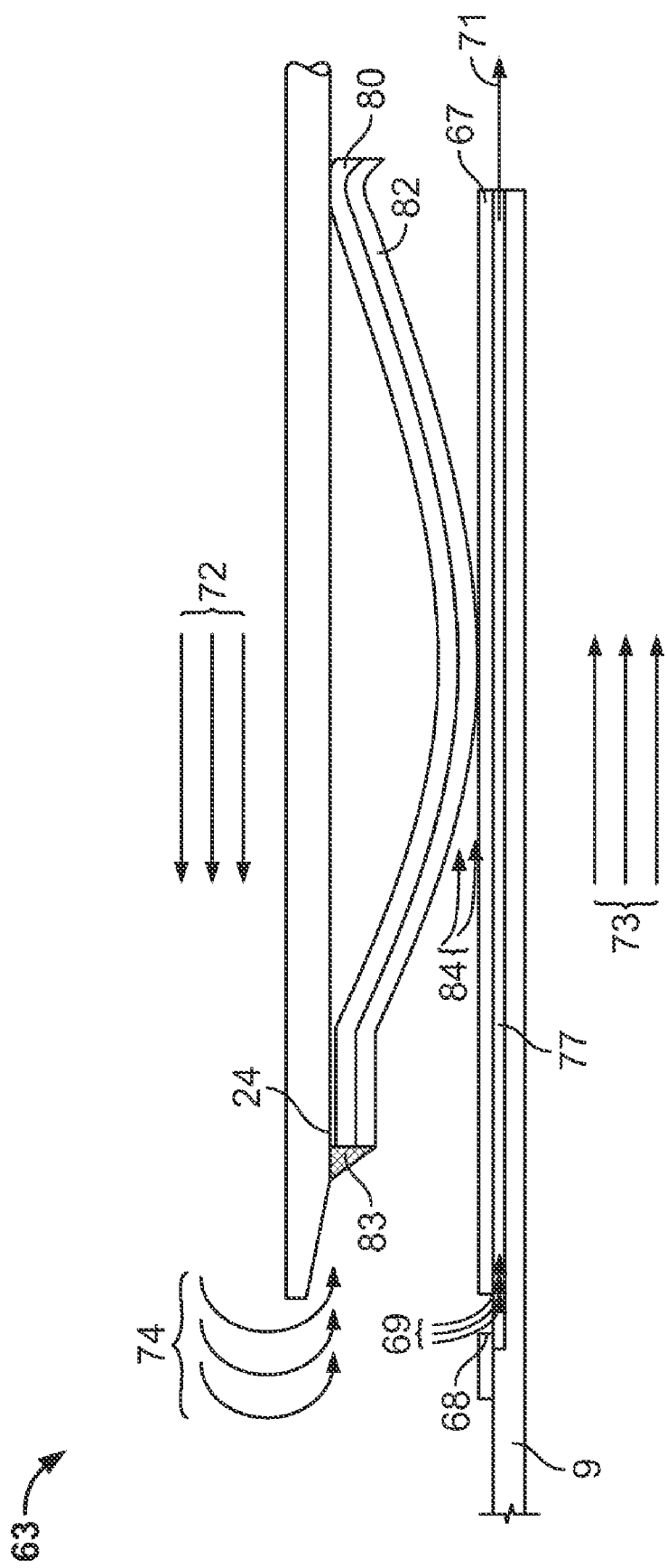
FIG. 9 is a view of an inverted hula seal and mating duct configuration in a cross sectional plane.

In some configurations of the present invention and referring to FIG. 9, interface 63 includes an inverted hula seal 82 attached by weld 83 to an inner wall 24 of transition piece 7. Configurations utilizing inverted hula seal 82 advantageously subject inverted hula attachment weld 83 to a relatively cooler thermal condition in which hula seal leakage flow 74, 84 is constantly passing and distal to hot gas flow 73, as compared to the prior art configuration illustrated in FIG. 8 wherein weld 70 is in closer proximity to hot gas flow 73. In addition, inverted hula seal 82 is mounted (welded) to a relatively cooler wall 24 compared to the prior art configuration illustrated in FIG. 8, wherein relatively more cooling air shown by cooling air flow arrows 69 and 71 is required to pass through heat exchanger cooling channel 77. Also, substantially less cooling air passing through cooling channel 77 of the heat exchanger is needed for the inverted hula seal 82 configuration than for the prior art hula seal 66 configuration shown in FIG. 8. Thus, less compressor air flow 72 is required as cooling air 69, 71 in cooling channel 77, and the air that is saved can instead be used in combustion burning zone 13 (FIG. 1). The use of this saved air results in lower NOx emissions than would otherwise occur. Moreover, because liner 9 is inserted and assembled inside an inner mating surface 24 (e.g., inner transition piece wall 24) with inverted hula seal 82 preinstalled, tips of hula seal fingers 80 are oriented so that the fingers are protected from damage that might otherwise occur during assembly.

Inverted hula seal 82 configurations such as that represented in FIG. 9 can be used when an inner mounting duct, such as cooling channel shroud 67, is formed of a material capable of higher temperature operation than typical metal components. (One example of such a material is a ceramic matrix composite.) Welding a hula seal to such a material is generally not possible, but an inverted hula seal 82 configurations such as that shown in FIG. 9 can be used instead. In combustor 1 of FIG. 1 as well as various other configurations of the present invention, it is advantageous to use an inverted hula seal configuration at interfaces 62 and 63. The net reduction in required cooling air when using inverted hula seals at these interfaces results in lower NOx emissions from combustor 1.

It will thus be appreciated that various configurations of the present invention satisfy the latest regulatory requirement for NOx emissions for 50 Hz power equipment without requiring additional treatment of gas turbine exhaust. In addition to reducing NOx emissions, various configurations of the present invention also achieve acceptable flame stability and a dynamic pressure of allowable magnitude.

While the invention has been described in terms of various specific embodiments, those skilled in the art will recognize that the invention can be practiced with modification within the spirit and scope of the claims.

The invention claimed is:

1. A gas turbine comprising:
   a combustor having at least one circular combustion chamber comprising a liner, a combustion cap, and a transition piece;
   a first inverted hula seal between the combustion cap and the liner;
   a second inverted hula seal between the transition piece and the liner;
   at least one inner fuel nozzle configured to inject a premixed fuel/air mixture into the circular combustion chamber;
   a plurality of outer fuel nozzles arranged around the at least one inner fuel nozzle and configured to inject premixed fuel/air mixtures into the circular combustion chamber; and
   a set of manifolds configured to provide a richer fuel/air mixture to the at least one inner fuel nozzle than to the plurality of outer fuel nozzles.

2. A gas turbine in accordance with claim 1 having five outer fuel nozzles and one inner fuel nozzle.

3. A gas turbine in accordance with claim 1 configured to utilize excess cooling air from premixing the fuel/air mixtures to further reduce NOx emissions.

4. A gas turbine in accordance with claim 1 wherein the liner is inserted and assembled inside an inner mating surface.

5. A gas turbine in accordance with claim 1 wherein at least one of the first inverted hula seal and the second inverted hula seal comprises hula seal fingers having tips, and an orientation of the hula seal finger tips is such as to protect the hula seal finger tips during assembly.

6. A gas turbine in accordance with claim 1 wherein the second inverted hula seal is welded to an inner wall of a transition piece where a hula seal leakage flow passes, and the weld is distal to a hot gas flow.

* * * * *